United States Patent
Cicchetti et al.

(10) Patent No.: US 7,546,451 B1
(45) Date of Patent: Jun. 9, 2009

(54) CONTINUOUSLY PROVIDING INSTRUCTIONS TO A PROGRAMMABLE DEVICE

(75) Inventors: Chris Cicchetti, Menlo Park, CA (US); Jean-François Dubé, Santa Clara, CA (US); Thomas Andrew Myers, San Jose, CA (US); An Huynh, Alameda, CA (US); Geoffrey T. Hibbert, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 224 days.

(21) Appl. No.: 10/174,621

(22) Filed: Jun. 19, 2002

(51) Int. Cl.
*G06F 9/00* (2006.01)
(52) U.S. Cl. .............. 713/100; 713/1; 713/2; 711/2; 711/5; 712/206
(58) Field of Classification Search ............. 713/1, 713/2, 100; 711/2, 5; 712/206
See application file for complete search history.

(56) References Cited

U.S. PATENT DOCUMENTS

| | | | |
|---|---|---|---|
| 4,399,507 A | 8/1983 | Cosgrove et al. | 364/200 |
| 4,599,647 A * | 7/1986 | George et al. | 380/242 |
| 5,202,975 A | 4/1993 | Rasbold et al. | 395/500 |
| 5,539,896 A * | 7/1996 | Lisle | 711/150 |
| 5,774,712 A | 6/1998 | Cheong et al. | 395/595 |
| 5,790,823 A * | 8/1998 | Puzak et al. | 712/207 |
| 5,835,745 A | 11/1998 | Sager et al. | 395/391 |
| 5,916,309 A * | 6/1999 | Brown et al. | 710/52 |
| 6,170,998 B1 | 1/2001 | Yamamoto et al. | 395/701 |
| 6,370,596 B1 * | 4/2002 | Dakhil | 710/15 |
| 6,598,112 B1 * | 7/2003 | Jordan et al. | 711/2 |
| 6,681,232 B1 * | 1/2004 | Sistanizadeh et al. | 707/104.1 |
| 2004/0073773 A1 * | 4/2004 | Demjanenko | 712/7 |

* cited by examiner

*Primary Examiner*—Tse Chen
(74) *Attorney, Agent, or Firm*—Workman Nydegger

(57) ABSTRACT

A system and method for enabling a programmable device to execute instructions without interruption. An instruction space for storing instructions from a host application is bifurcated to define a program segment and a hold segment. At startup, instructions are loaded into the hold segment, and the programmable device begins executing those instructions. While the hold segment instructions are executed, the program segment is loaded with instructions. Once the program segment is filled, control is shifted to it and instructions from this segment are executed by the programmable device. When the program segment has been executed, control is shifted back to the hold segment, and instructions are taken from it while the program segment is reloaded with a fresh set of instructions from the host application. Once the program segment is reloaded, control is redirected and execution of instructions from the program segment is continued.

29 Claims, 4 Drawing Sheets

CONTINUOUSLY PROVIDING INSTRUCTIONS TO A PROGRAMMABLE DEVICE

BACKGROUND OF THE INVENTION

1. The Field of the Invention

The present invention is related to programmable devices. More particularly, the present invention relates to a method by which programmable devices, such as network processors, can continuously execute instructions without interruption.

2. The Related Technology

In recent years, the use of programmable devices has grown tremendously. Programmable devices, such as central processing units for personal computers, or application-specific integrated circuits used in industrial and consumer electronics, have a variety of important uses. In general, programmable devices operate by executing instructions provided by a host application. The instructions are loaded from the host application into an instruction stack. The instructions in the stack are accessed and executed line-by-line by the programmable device until all of the instructions are exhausted. The programmable device is then temporarily idled, or interrupted, while new instructions are loaded into the stack.

One example of a particularly useful programmable device is a network processor. A network processor is used to analyze data contained in communications traffic transmitted via a communications medium, such as a computer network. The data are monitored by the network processor to discover and diagnose possible problem conditions existing within the network, thereby enabling corrective action to be taken.

A new generation of network processors, known as synchronous network processors, has recently been developed to meet the demand for analysis of communications traffic transmitted via high-speed networks, where the transmission rate can exceed 1 gigabit per second. This new generation of synchronous network processors represents a significant advancement in the art. Older network processors are unable to analyze the full volume of network traffic at the same rate at which the traffic is transmitted via the high-speed network, and must therefore use memory registers to buffer the incoming traffic, then analyze it at a slower rate or analyze less than the full volume of data. In contrast, synchronous network processors are able to input and analyze data at a rate synchronous with the speed at which the traffic is passed through the network, which as stated above, can reach rates of 1 gigabit per second or more. Thus, synchronous network processors are superior in their ability to monitor and debug network traffic while eliminating latency between data input and processing.

Notwithstanding their enhanced capability, however, synchronous network processors have not been usable in certain processing environments in which it is important to avoid interruption of the instructions that are provided to the processors. In order to process network traffic effectively in such processing environments, the synchronous network processor would need to be able to continually execute instructions from a host application without interruption. However, conventional techniques of using an instruction stack to provide the instruction input are not compatible with such requirements, because the act of reloading the instruction stack causes interruption of the processor. Thus, synchronous network processors have not been capable of use in an entire class of processing environments.

One example of an operating environment in which continuous execution of instructions is important is one in which the network processor communicates over a data link with another device using a protocol that requires periodic transmission of data packets or ordered sets. In general, continuous execution of instructions is required when the network processor is originating or repeating network data traffic or performing another function that requires either continuous operation or data output.

One approach to extending the usefulness of synchronous network processors is to increase the size of the memory components that implements the instruction stack, thereby reducing the frequency by which the instruction stack needs to be reloaded. However, a larger instruction stack increases the cost and can reduce the efficiency of the processors. Moreover, to the extent that the larger instruction stacks still need to be reloaded during operation of the processors, the act of reloading the instruction stacks can nonetheless cause unacceptable interruption of the operation of the processors.

A need therefore exists whereby a constant stream of instructions can be reliably provided to a programmable device, such as a synchronous network processor, in order to avoid inconsistent or erroneous results that can otherwise occur. A further need exists to ensure proper operation of a synchronous network processor in connection with high-speed communications networks having line speeds exceeding 1 gigabit per second.

BRIEF SUMMARY OF THE INVENTION

The present invention has been developed in response to the above and other needs in the art. Briefly summarized, embodiments of the present invention are directed to a system and method of providing instructions to a programmable device without interruption. Though it can be employed with a variety of programmable devices that execute instructions from an instruction stack, the present invention finds particular application with synchronous network processors that rely on a continuous input stream of instructions to operate properly.

According to one embodiment, the present system generally comprises a programmable device that receives instructions from an instruction space. The instructions are provided by a host application, such as a computer software program. The instruction space is divided into two segments. A hold segment contains a set of executable instructions, known as a hold routine, loaded from the host application for execution by the programmable device. A program segment contains another set of executable instructions, known as a program routine, loaded from the host application for execution by the programmable device. Generally, the program routine represents executable instructions for causing the programmable device to perform its desired functionality, such as processing or analyzing network data, controlling the operation of network devices, originating or repeating network data traffic, or substantially any other functionality that is to be performed by the programmable device. In contrast, the hold routine generally represents executable instructions to be executed while the programmable device waits to execute a subsequent program routine, to signal to the application that another program routine can be loaded to the program segment, to transfer control back to the loaded program routine of the program segment, or other such routines that facilitate the operation of the programmable device between the time periods when the program routines are executed.

The primary constraint on the relative size of the hold segment and the program segment is that they cumulatively should not exceed the size of the instruction stack. The size of the two segments can change as successive program routines are loaded into the instruction stack. In addition, the base address of the hold segment can change or migrate as successive cycles of hold routines and program routines are loaded. The two instruction space segments cooperate to provide a continuous flow of instructions to the programmable device. This continuous instruction flow is especially useful for synchronous network processors that require a constant inflow of instructions in order to ensure proper operation while monitoring a communications network traffic stream.

When operation of the network processor is commenced, both the program and hold segments are loaded with instructions. The network processor begins executing the hold routine in the hold segment, waiting for a signal from the host application that it is time to execute the program routine in the program segment. At that point, the hold routine passes control to the program segment, which reverts back to the hold segment after execution of the program routine is completed. When the hold routine is run again, it signals the host application that it is now safe to load a new program routine into the program segment. Those transfers occur without interrupting the continuous flow of instructions into the processor. While the network processor executes the instructions in the hold segment, the program segment can be reloaded with a fresh set of instructions from the host application in preparation for control to be returned to it.

After reloading of the program segment is complete, control is transferred from the hold segment to the program segment, and instructions from the program segment are again provided to the network processor without interruption. If needed, instead of loading the program routine, a new hold routine can be loaded into a second hold segment while the processor is executing the original hold routine. When control is transferred to the new hold segment, the original hold segment is discarded and the original hold routine can be overwritten by a program routine. This coordinated and uninterrupted provision of instructions to the network processor by the program and hold segments ensures proper operation of the processor while at the same time allowing for incremental instruction reloading to occur as needed.

The present method can also employ a "handshaking" procedure to ensure smooth transition of instructional control between the program and hold segments during processor operation. This handshaking procedure ensures that control is not switched from one instruction space segment to the other before all instructions have been properly loaded into the latter segment.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1-4 depict embodiments of the present invention, which is directed to a system and method of providing instructions to a programmable device in a continuous fashion such that the device is able to operate without interruption. The present system and method can be applied particularly to network traffic processors and protocol analyzers, where continuous instruction input is critical to ensure proper functioning of the device.

As it name implies, a programmable device can be programmed to perform one or more specified functions. A microprocessor, which inputs data and performs necessary operations on the data, is one example of a programmable device. An application-specific integrated circuit, which can be employed in a variety of electronic components, is another. The programmable device can be implemented as a discrete device or in connection with a variety of components. In one presently preferred embodiment of the present invention, the programmable device comprises a synchronous network processor, as described in further detail below.

Figure 1:
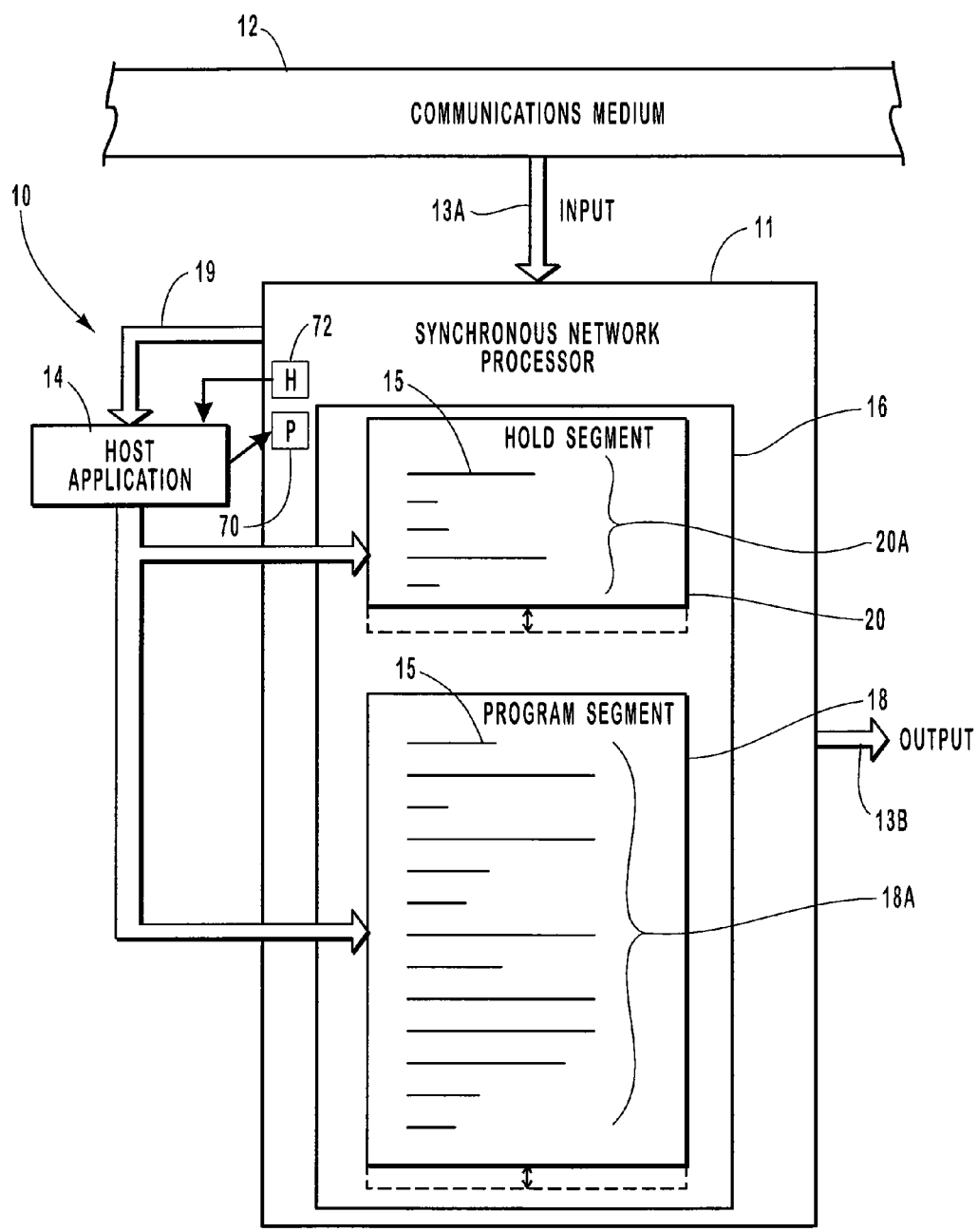
FIG. 1 is a block diagram showing various components utilized in accordance with one embodiment of the present system.

Reference is first made to FIG. 1, which depicts various components and aspects associated with a programmable device system, generally designated at 10. In the illustrated embodiment, the present system 10 is utilized in connection with a programmable device, such as a synchronous network processor, designated at 11. Although the following description is made in reference to a network processor 11, the principles of the invention also extend to other programmable devices.

As depicted in FIG. 1, the synchronous network processor 11 can be employed to monitor and analyze communications traffic that is transmitted via a communications medium 12. The communications medium 12 can interconnect various components that communicate with one another to form a network, such as a computer-based local area network ("LAN") or wide area network ("WAN"). The communications network can also comprise a portion of the Internet. During operation, the network processor 11 continuously receives communications traffic from the communications medium 12. This traffic input is designated at 13A. The network processor 11 analyzes the communications traffic to detect problem conditions that may be present in or represented by the traffic or to otherwise analyze the nature of the communications traffic. For instance, the network processor could detect an unacceptably large amount of time transpiring between a request for specified data by one component of the communications network and a responsive transmission of that data by the petitioned component. Such a condition might indicate that one of the components in the transaction is malfunctioning. Upon detecting a possible problem condition, the network processor 11 alerts an operator or technician so that corrective action can be taken. This alert and other information that is produced by the network processor 11 is delivered by the processor as output, which is designated in the figure at 13B.

In one embodiment, a host application 14 is utilized to enable the synchronous network processor 11 to operate as described above. The host application 14 supplies to the network processor 11 a series of instructions 15 that program the processor and direct its operation. Network processor 11 also supplies output 19 to host application 14, which informs the host application of the status of the execution instructions 15, enabling the host application to reload new instructions at appropriate times.

The synchronous network processor 11 is programmed such that it receives and analyzes data at the line speed of the traffic transmitted via the communications medium 12. For example, a synchronous network processor operably connected to a communications network having a line speed of one gigabit per second ("Gbps") is able to input and process incoming traffic at the same rate, thereby eliminating the need for buffering and producing only a small amount of negligible, constant latency between the input 13A and the output 13B of the network processor and enabling the full volume of data to be processed. An example of a synchronous network processor that can input and analyze data at line speeds exceeding one Gbit per second is found in U.S. patent application Ser. No. 09/976,756, entitled "Synchronous Network Traffic Processor," filed Oct. 12, 2001, which is incorporated herein by reference in its entirety.

As already discussed, the synchronous network processor 11 requires a continuous flow of inputted instructions 15 in order for it to operate correctly in analyzing traffic from the communications medium 12. Absent this continuous flow of instructions 15, the processor pointer is halted and the last output assignment is repeatedly executed, resulting in uncontrolled output by network processor 11. It will be seen below how the synchronous network processor 11 can particularly benefit from the present invention. It should be noted, however, that other programmable devices, in addition to synchronous network processors, can also benefit from the present invention. Examples of such other programmable devices include but are not limited to microprocessors and non-synchronous network processors. The description given herein in connection with synchronous network processors should therefore not be construed as to be limiting of the present invention in any way.

As mentioned before, the host application 14 generally includes a plurality of instructions that are executed by the network processor 11. In preparation for execution by the network processor, the instructions are loaded from the host application into a memory component defining an instruction space. After being loaded into the instruction space of the memory component, the group of instructions is referred to as an instruction stack. Thus, an instruction stack comprises one or more lines of instructions loaded from a host application that are accessible by the network processor. The instructions in the instruction stack are typically in machine code format and are executed line-by-line by the network processor. Embodiments of the present invention are designed so as to avoid problems that can occur with the operation of the synchronous network processor when the instructions in the instruction stack are exhausted by the processor. In accordance with embodiments of the present invention, the present system and method for continuously providing instructions to the synchronous network processor 11 is implemented via a bifurcated instruction stack. The bifurcated instruction stack is disposed within an instruction space defined in a memory component. The bifurcated instruction stack cooperatively operates to provide a continuous flow of instructions to the synchronous network processor, as described below.

As illustrated in FIG. 1, an instruction space 16 is defined. The instruction space 16 comprises a portion of a memory unit, such as a random access memory (RAM) component of the synchronous network processor 11. The memory unit could alternatively comprise a variety of other configurations.

FIG. 1 shows the instruction space 16 bifurcated into two segments: a program segment 18 and a hold segment 20. Hold segment 20 contains a set of executable instructions, known as a hold routine or a hold instruction stack 20A, loaded from the host application for execution by the network processor 11. Program segment 18 contains another set of executable instructions, known as a program routine or a program instruction stack 18A, loaded from the host application for execution by the network processor 11.

Generally, the program routine 18A represents executable instructions for causing the network processor 11 to perform aspects of its desired functionality, such as processing or analyzing network data, controlling the operation of network devices, originating or repeating network data traffic, or substantially any other functionality that is to be performed by the network processor. In contrast, the hold routine 20A of hold segment 20 generally represents executable instructions to be executed while the network processor 11 waits to execute a subsequent program routine 18A, to signal to the application that another program routine can be loaded, to transfer control back to the loaded program routine, or other such routines that facilitate the operation of the network processor 11 between the time periods when the program routines are executed. During operation of the network processor 11, the hold routine 20A is executed when the program routine 18A is not.

The primary constraint on the relative size of the hold segment 20 and the program segment 18 is that they cumulatively should not exceed the size of the instruction space 16 and can coexist without overwriting each other. The size of the two segments can change as successive program routines 18A are loaded into the instruction stack. In addition, the base address of the hold segment 20 can change or migrate as successive cycles of hold routines 20A and program routines 18A are loaded. The two instruction space segments cooperate to provide a continuous flow of instructions to the programmable device. This continuous instruction flow is especially useful for synchronous network processors that require a constant inflow of instructions in order to ensure proper operation while monitoring a communications network traffic stream.

As seen in the illustrated embodiment, the hold segment 20 is smaller in capacity than the program segment 18. It is appreciated, however, that the relative capacity of each instruction stack is dynamic and may vary as needed for a particular application. For example, depending on the requirements of the processor and the nature of the instructions, the hold segment 20 can have a larger capacity than that of the program segment 18. It is further appreciated that the instruction space 16 may also comprise an area for instructions outside of the space occupied by the program segment 18 and the hold segment 20.

Figure 2:
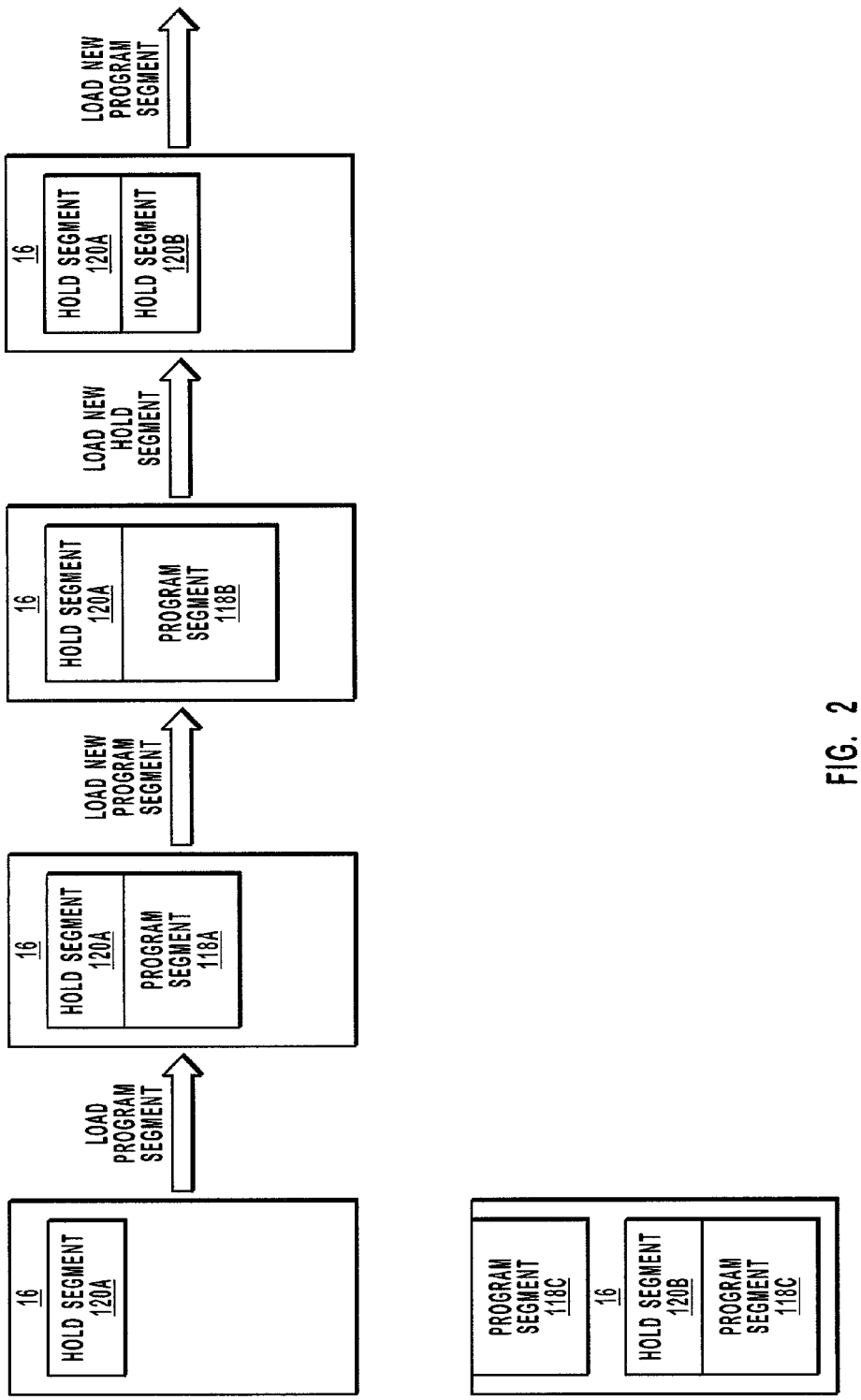
FIG. 2 illustrates sequential configurations of the instruction space of FIG. 1 in accordance with one embodiment of the present invention.

FIG. 2 illustrates one example of a sequence of hold segments and program segments defined in an instruction space. Initially, a hold segment 120A is defined in instruction space 16, and the hold routine of hold segment 120A is run. This can occur at power-up or when the system is initialized in preparation for starting the operation of the network processor. When program instructions need to be provided to the network processor, the host application loads a program routine in program segment 118A using the handshaking operation described hereinbelow.

In one implementation of the invention, the first line of the program segment 118A can be positioned immediately after the last line of the hold segment 120A. Control passes to program segment 118A and then, after the program routine is run, control passes back to hold segment 120A. When control returns to hold segment 120A, the host application determines whether program segment 118A is to be overwritten with a new program segment or a new hold segment. In the illustrated example, program segment 118A is overwritten with a new program segment 118B.

Control then passes to the new program segment 118B and then, when the program segment is run, control passes back to hold segment 120A. Again, when control returns to hold segment 120A, the host application determines whether program segment 118B is to overwritten with another program segment or a new hold segment. In the example illustrated in FIG. 2, the host application overwrites program segment 118B with a new hold segment 120B. In one implementation, the first line of the new hold segment 120B can be positioned immediately after the last line of the previous hold segment 120A. Control then passes to the new hold segment 120B and the hold routine is executed, after which a new program segment 118C may be loaded. This process can continue as hold routines control the loading of either new hold routines or new program routines using the handshaking operations described hereinbelow.

It can be seen that the base address of the successive hold segments (e.g., hold segments 120A and 120B) in the instruction space 16 can change, due to the dynamic size and position of the successive hold segments and program segments. Because the instruction space is circular, the hold segments 120 and the program segments 118 can wrap from the end of the instruction space 16 to the beginning thereof, if necessary.

In a presently preferred embodiment, the details concerning the loading of instructions into the program segment 18 and the hold segment 20 are governed by the host application 14. These details include the timing of instruction loading, which segment is loaded first, from where in the host application 14 the instructions are taken, etc. The program and hold segments 18, 20 can alternatively be controlled by the programmable device or other component. Once loaded, each segment contains a set of instructions referred to as a program instruction stack 18A for the program segment 18, and a hold instruction stack 20A for the hold segment 20, respectively.

Figure 3:
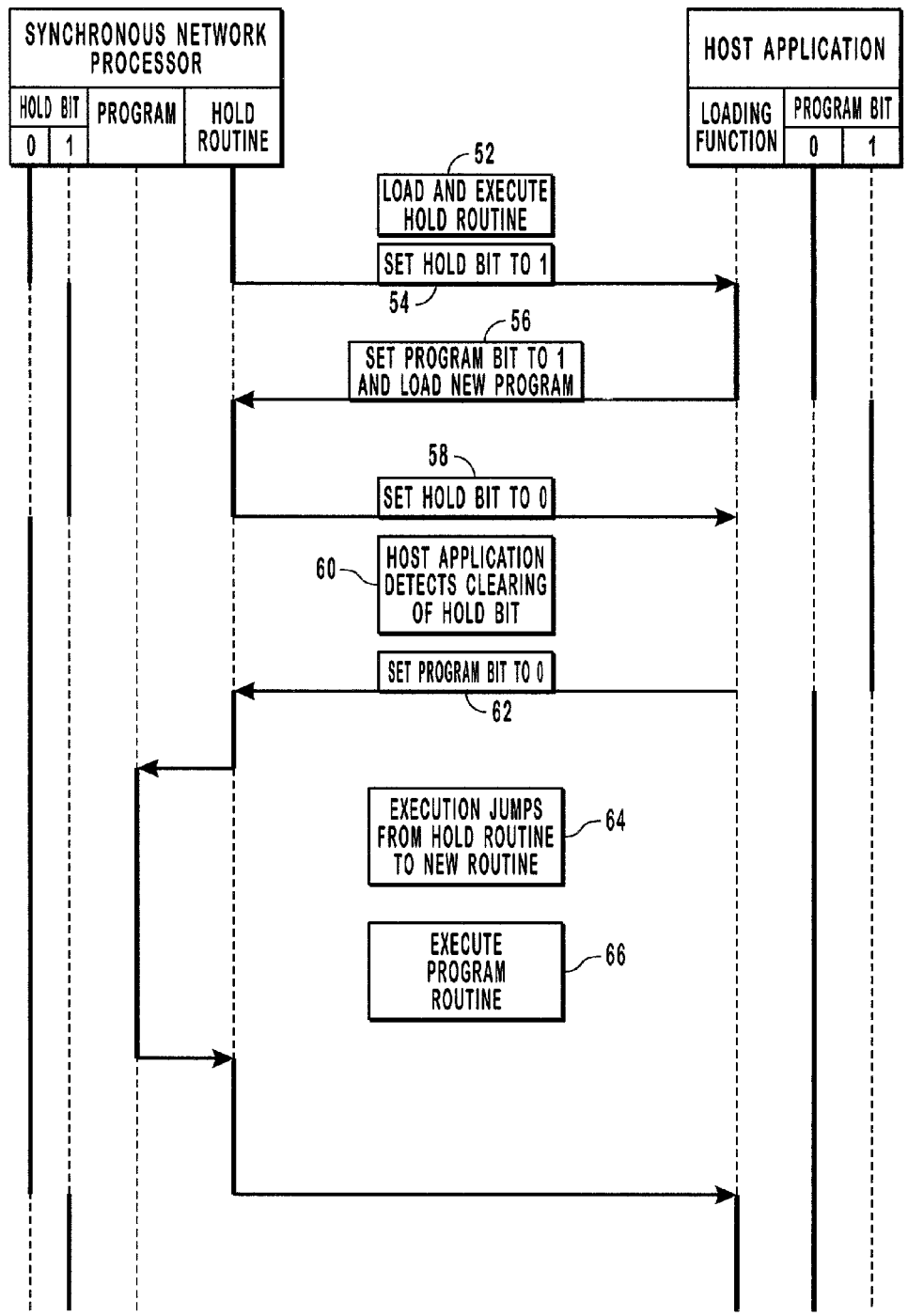
FIG. 3 is a flowchart illustrating various steps performed in accordance with one embodiment of the present method.

Reference is now made to FIG. 3, which illustrates several steps involved in operation of the system shown in FIG. 1 according to a presently preferred embodiment. The method of FIG. 3 also involves a handshaking procedure by which the host application 14 and the network processor 11 communicate to each other the status of the loading and execution of the hold segment and the program segment. As shown in FIG. 1 and as will be further described below in reference to FIG. 3, a hold bit 72 having a value of "0" or "1" and a program bit 70 having a value of "0" or "1" are used to communicate this information and to perform the handshaking procedure.

Initially, a hold routine is loaded into a hold segment, and the network processor executes the hold routine in step 52. The hold routine signals to the host application 11 in step 54 that it is safe to load a new routine into the other segment. The new routine can be either another hold routine or a program routine in a second hold segment or a program segment, respectively. The hold routine signals that it is safe to load the new routine using hold bit 72. In this example, a hold bit having a value of "1" signals that it is safe to load the new routine.

In response to detecting the hold bit having the value "1", the host application 14 in step 56 signals to the hold routine being executed by the network processor 11 that it is starting to load the new routine into either a program segment or a second hold segment by setting the value of program bit 70. In this example, a program bit having a value of "1" specifies that the host application is loading the new routine. According to step 58, when the hold routine detects the program bit "1", it signals that fact to the host application 14 by clearing the hold bit 72 (i.e., setting the hold bit value to "0"). The hold routine continues to be executed while waiting for the program bit to be cleared, which will indicate that the next routine has been loaded and is ready for execution. In the meantime, the hold routine can cause the network processor 11 to continue performing certain functions, such as keeping a communication link active while the next routine is loaded. In this manner, the hold routine enables the network processor 11 to continually execute instructions while new routines are loaded.

As noted above, and as illustrated at step 60, the host application becomes aware of the fact that the hold routine has detected the program bit "1" (indicating the process of loading the next routine) by determining that the hold bit has been cleared. This process represents the handshaking process, whereby the hold routine and the host application communicate with each other and coordinate the timing of the loading of the next routine and the subsequent execution thereof.

In step 62, the host application 14 clears the program bit, which signals to the network processor 11 that the routine in the other segment can then be executed. In step 64, execution jumps from the hold segment to the other segment. For instance, if the other segment is a program segment, the program routine of the program segment can then be executed in step 66. In this manner, the hold routine of the hold segment can be used to coordinate the activity of the host application 14 to load a program routine into the program segment and to cause the program segment to be executed. If, however, the other segment is yet another hold segment having a hold routine, the method reverts to step 52, in which the hold routine of the hold segment is processed such that another segment (i.e., a program segment or another hold segment) is loaded with corresponding instructions. After step 66, in which a program routine is executed, control is returned to the hold segment, which is the same hold segment originally existing in the instruction space.

The above steps of the present method are automatically repeated until termination of network processor operation or termination of the host application 14. Thus, it is seen that incorporation of the hold segment 20 into the bifurcated instruction space 16 enables the program segment 18 to be reloaded with new instructions 15 after exhaustion of the previous set. This in turn preserves continuous instruction flow to the network processor 11, helps to ensure that consistent results are achieved by the processor and that the network processor can continually operate.

The present method enables a programmable device to be utilized in such applications as the diagnostic evaluation of storage area networks, for instance, where a synchronous network processor continuously operating at the line speed of the network is utilized. However, this is merely one example of how the present method can be utilized; many other applications are also contemplated.

It is appreciated that, while the above description has focused on the creation of a bifurcated instruction space having two segments, the instruction space could be divided into more than two sections. For example, the instruction space could contain three segments, with each segment being independently loadable with instructions from the host application.

Figure 4:
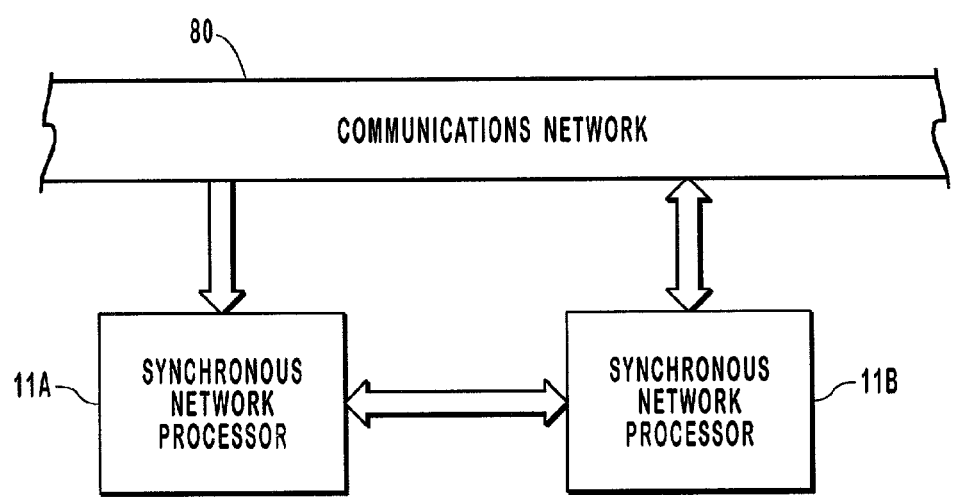
FIG. 4 is a block diagram showing components utilized in accordance with an alternative embodiment of the present invention.

It is further appreciated that, in one embodiment, multiple network processors could be utilized in conjunction with one another. In this case, one network processor can be designated as a master processor, directing and coordinating the operations of servant processors. FIG. 4 illustrates one processing environment representing an example of the use of multiple network processors in combination with the methods of the invention for continually supplying instructions to an instruction space. According to FIG. 4, two network processors operate in sequence to perform different operations associated with a process of analyzing network data. In particular, the first network processor 11A performs the operation of scanning frames of data and identifying frames containing specified data patterns. Network processor 11A forwards any such identified frames to a second network processor 11B. Network processor 11B in turn transmits data to communications network 80 using any frames that have been supplied from the first network processor 11A. In this example, only the second network processor 11B transmits data to the communications network 80. Thus second network processor 11B cannot be interrupted without also interrupting the transmission of data onto the communications network. In contrast, first network processor 11A can be interrupted without causing disruption on the communications network 80.

While FIG. 4 illustrates one example of a set of network processors, one or more of which require continuous access to executable instructions, the invention is applicable to any of a variety of other computing or processing environments having programmable devices that require continuous access to executable instructions.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A method of providing and executing a continuous flow of instructions, the method comprising the acts of:
   (a) accessing, by a host processor, an instruction space of a memory component of a programmable device, the instruction space having a hold segment and a program segment;
   (b) loading, by the host processor, hold instructions into the hold segment of the instruction space, the hold instructions comprising a looping routine;
   (c) executing, by the programmable device, at least a portion of the hold instructions loaded in the hold segment;
   (d) while the programmable device is executing the hold instructions, signaling, by the programmable device to the host processor, that the program segment is ready to be loaded;
   (e) in response to the signaling by the programmable device in act (d), loading, by the host processor, a first set of program instructions into the program segment of the instruction space;
   (f) signaling, by the host processor to the programmable device, that the program segment is loaded;
   (g) in response to the signaling by the host processor in act (f), terminating execution of the hold instructions and executing without substantial interruption, by the programmable device, the first set of program instructions loaded in the program segment; and
   (h) upon completion of act (g), automatically reverting back, by the programmable device, to executing the hold instructions loaded in the hold segment in act (b) such that the hold instructions begin executing without substantial interruption after the execution of the first set of program instructions has completed.

2. A microprocessor in connection with which the method of claim 1 is performed, the microprocessor being configured to perform the hold and program instructions.

3. A method of providing and executing a continuous flow of instructions as defined in claim 1, wherein the relative sizes of the hold segment and the program segment are dynamically changed during operation of the programmable device.

4. A network processor in connection with which the method of claim 1 is performed, the network processor being configured to perform the hold and program instructions.

5. The network processor as recited in claim 4, wherein the network processor comprises one of: a synchronous network processor; and, an asynchronous network processor.

6. A method of providing and executing a continuous flow of instructions as defined in claim 1, further comprising:
   (i) while the programmable device is executing the hold instructions in act (h), signaling, by the programmable device to the host processor, that the program segment is ready to be loaded;
   (j) in response to the signaling by the programmable device in act (i), loading, by the host processor, a second set of program instructions into the program segment;
   (k) after completion of act (j), signaling, by the host processor to the programmable device, that the program segment is loaded; and
   (l) in response to the signaling by the host processor in act (k), terminating execution of the hold instructions and executing without interruption, by the programmable device, the second set of program instructions loaded in the program segment.

7. A method of providing and executing a continuous flow of instructions as defined in claim 1, wherein the programmable device is used to monitor input from a communications medium.

8. A method of providing and executing a continuous flow of instructions as defined in claim 1, wherein the programmable device is a network traffic processor.

9. A method of providing and executing a continuous flow of instructions as defined in claim 1, wherein
   the act of signaling in act (d) is performed by using a hold bit that is modifiable by the programmable device and readable by the host processor, and
   the act of signaling in act (f) is performed by using a program bit that is modifiable by the host processor and readable by the programmable device.

10. A method of providing and executing a continuous flow of instructions as defined in claim 9,
    wherein the act of signaling by the programmable device in act (d) comprises setting the hold bit and the act of signaling by the host processor in act (f) comprises clearing the program bit.

11. A method of providing and executing a continuous flow of instructions as defined in claim 10,
    wherein the program bit is set by the host processor at the commencement of act (e) and the hold bit is cleared by the programmable device in response to the program bit being set by the host processor.

12. A method of providing and executing a continuous flow of instructions, the method comprising the acts of:

(a) accessing, by a host processor, an instruction space of a memory component of a programmable device;

(b) loading, by the host processor, a first set of hold instructions into a first hold segment of the instruction space, the first set of hold instructions comprising a first looping routine;

(c) executing, by the programmable device, at least a portion of the first set of hold instructions loaded in the first hold segment;

(d) loading, by the host processor, a second set of hold instructions into a second hold segment of the instruction space, the second set of hold instructions comprising a second looping routine;

(e) signaling, by the host processor to the programmable device, that the second hold segment is loaded;

(f) terminating execution of the first set of hold instructions and executing without substantial interruption, by the programmable device, at least a portion of the second set of hold instructions loaded in the second hold segment;

(g) loading, by the host processor, a first set of program instructions into a program segment of the instruction space;

(h) signaling, by the host processor to the programmable device, that the program segment is loaded; and (i) terminating execution of the second set of hold instructions and executing without substantial interruption, by the programmable device, the first set of program instructions loaded in the program segment, wherein the instruction space is circular such that any one of the first and second sets of hold instructions and first set of program instructions can be loaded to wrap from an end of the instruction space to a beginning of the instruction space.

13. A method of providing and executing a continuous flow of instructions as defined in claim 12, further comprising:

(j) after completion of act (i), executing without substantial interruption, by the programmable device, the second set of hold instructions loaded in the second hold segment.

14. A method of providing and executing a continuous flow of instructions as defined in claim 13, further comprising:

(k) loading, by the host processor, a second set of program instructions into the program segment; and (l) terminating execution of the second set of hold instructions and executing without substantial interruption, by the programmable device, the second set of program instructions loaded in the program segment.

15. A method of providing and executing a continuous flow of instructions as defined in claim 12, wherein the first hold segment is overwritten by the program segment.

16. A method of providing and executing a continuous flow of instructions as defined in claim 12, further comprising:

(j) after completion of act (b) and before commencement of act (d), signaling, by the programmable device to the host processor, that the second hold segment is ready to be loaded; and (k) after completion of act (d) and before commencement of act (g), signaling, by the programmable device to the host processor, that the program segment is ready to be loaded.

17. A method of providing and executing a continuous flow of instructions as defined in claim 12, wherein the programmable device is used to monitor input from a communications medium.

18. A method of providing and executing a continuous flow of instructions, the method comprising the acts of:

(a) accessing, by a host processor, an instruction space of a memory component of a programmable device, the instruction space having a hold segment and a program segment;

(b) loading, by the host processor, hold instructions into the hold segment of the instruction space, the hold instructions comprising a looping routine;

(c) executing, by the programmable device, the hold instructions loaded in the hold segment;

(d) while the programmable device is executing at least a portion of the hold instructions, signaling, by the programmable device to the host processor, that the program segment is ready to be loaded;

(e) in response to the signaling by the programmable device in act (d), loading, by the host processor, program instructions into the program segment of the instruction space;

(f) signaling, by the host processor to the programmable device, that the program segment is loaded; and (g) in response to the signaling by the host processor in act (f), terminating execution of the hold instructions and executing without substantial interruption, by the programmable device, the program instructions loaded in the program segment;

wherein the program instructions, when executed, cause the programmable device to perform a desired network communications function and the hold instructions, when executed, cause the programmable device to perform a function other than the desired network communications function.

19. A method of providing and executing a continuous flow of instructions as defined in claim 18, wherein the act of signaling by the programmable device in act (d) comprises setting the hold bit and the act of signaling by the host processor in act (f) comprises clearing the program bit.

20. A method of providing and executing a continuous flow of instructions as defined in claim 19, wherein the program bit is set by the host processor at the commencement of act (e) and the hold bit is cleared by the programmable device in response to the program bit being set by the host processor.

21. A microprocessor in connection with which the method of claim 18 is performed, the microprocessor being configured to perform the hold and program instructions.

22. A method of providing and executing a continuous flow of instructions as defined in claim 18, wherein the relative sizes of the hold segment and the program segment are dynamically changed during operation of the programmable device.

23. A network processor in connection with which the method of claim 18 is performed, the network processor being configured to perform the hold and program instructions.

24. The network processor as recited in claim 23, wherein the network processor comprises one of: a synchronous network processor; and, an asynchronous network processor.

25. A method of providing and executing a continuous flow of instructions as defined in claim 18, wherein the programmable device is used to monitor input from a communications medium.

26. A method of providing and executing a continuous flow of instructions as defined in claim 18, wherein the programmable device is a network traffic processor.

27. A method of providing and executing a continuous flow of instructions, the method comprising the acts of:

dividing an instruction space of a memory component of a programmable device into a hold segment and a program segment;

receiving a first set of hold instructions in the hold segment, the first set of hold instructions comprising a looping routine;

executing at least a portion of the first set of hold instructions while receiving a first set of program instructions in the program segment;

executing the first set of program instructions; and reverting back to executing the first set of hold instructions originally received in the hold segment upon completing execution of the first set of program instructions.

28. A method of providing and executing a continuous flow of instructions as defined in claim 27, the method further comprising:

relocating the hold segment in the instruction space;

receiving a second set of hold instructions in the relocated hold segment, the second set of hold instructions comprising a looping routine;

relocating the program segment in the instruction space;

executing at least a portion of the second set of hold instructions while receiving a second set of program instructions in the relocated program segment;

executing the second set of program instructions; and reverting back to executing the second set of hold instructions upon completing execution of the second set of program instructions.

29. A method of providing and executing a continuous flow of instructions as defined in claim 28, wherein relocating the hold segment in the instruction space includes changing a base address of the hold segment and, wherein relocating the program segment in the instruction space includes changing a base address of the program segment.

* * * * *